United States Patent

[11] 3,599,903

[72] Inventor Eugene H. Handler
 4217 Brookfield Drive, Kensington, Md. 20795
[21] Appl. No. 839,466
[22] Filed July 7, 1969
[45] Patented Aug. 17, 1971

[54] HIGH PERFORMANCE SEAPLANE OR AMPHIBIAN
 4 Claims, 4 Drawing Figs.

[52] U.S. Cl. ................................................ 244/13, 244/101, 244/105
[51] Int. Cl. ................................................ B64c 35/00
[50] Field of Search ................................... 244/13, 101, 105, 106; 114/66.5 H

[56] References Cited
 UNITED STATES PATENTS
 1,825,578  9/1931  Cernuda ........................ 244/35
 2,793,827  5/1957  Ries et al. ..................... 244/105
 D126,523  8/1940  Eaton, Jr. ...................... 244/105
 1,400,262  12/1921 Caproni ......................... 244/105
 3,207,246  9/1965  Weiland ........................ 244/23
 3,498,247  3/1970  Handler ........................ 114/66.5 H Primary Examiner—Milton Buchler
Assistant Examiner—Steven W. Weinrieb
Attorneys—L. A. Miller, Q. E. Hodges and A. Sopp ABSTRACT: A high performance, low drag, high density seaplane having low reserve buoyancy and a low wing with a central hull supporting passenger cockpit unit thereabove, said hull carrying a hydrofoil beneath for quick takeoff, the central hull also acting as a main fuselage supporting the tail assembly. The power plant may be located in the cockpit unit or in the tail unit.

PATENTED AUG 17 1971

INVENTOR
EUGENE H. HANDLER

BY *O. Hodges*
*Albert Hopp*

ATTORNEYS

INVENTOR
EUGENE H. HANDLER

HIGH PERFORMANCE SEAPLANE OR AMPHIBIAN

BACKGROUND OF THE INVENTION

A conventional flying boat (seaplane carrying the crew in the hull) has enormous reserve buoyancy (volume) to keep the crew, wing and engines clear of water and spray under all expected operating conditions. This large volume results in large frontal and lateral area, which causes high aerodynamic drag. The structure of a large volume flying boat hull weighs more than the much smaller fuselage of a corresponding land plane. In general it may be said that large volume of an airplane is generally equivalent to low density, and low density implies low speed.

If a seaplane is to achieve high aerodynamic performance, it must have minimum volume, frontal and lateral area, as in the case of a fighter aircraft and high speed bomber or jet transport. The purpose of this invention is to provide a water-based aircraft performance comparable to a high performance land plane, and this can be achieved only by a drastic reduction in aerodynamic drag (frontal and surface area) and consequently hull volume. Therefore, the crew must be moved from the hull to a nacelle clear of the water. This, of course, is true of any conventional land plane mounted on twin floats, but in this case there exists a redundancy of volume: the floats and the fuselage. This conversion also adds, in general, a startling array of struts, spreader bars, guy wires, and other drag-producing items.

SUMMARY OF THE INVENTION

This invention provides a low drag high density seaplane of unique design, making use of a hydroski or supercavitating hydrofoil as part of the hydrodynamic system. The wing is placed very near, but above, the static waterline, thereby eliminating struts to the wing floats, and substantially increasing aerodynamic lift due to ground effect. This location also places the wing in the spray pattern, but this slight penalty is considered acceptable during the low speed phase of takeoff. Reserve buoyancy of the hull is about 25 percent and may be less rather than the traditional 200 percent—400 percent. Length/beam ratio is about 15 to 20 (the hull may resemble the general series of high length/beam ratio hulls developed by NACA) or alternatively may be a streamlined body of revolution with longitudinal steps or strips. Thirty to 40 percent deadrise or a rounded bottom may be provided to give good load alleviation and spray deflection during takeoffs and landings. A shallow step just forward of the C.G. may be employed. The step may be retractable.

The pilot and engine are carried in a streamlined nacelle supported by a faired strut to produce minimum drag. Propellers may be tractor, pusher, or both. Jet propulsion may also be employed provided that the intake is located in a spray free location. The tail structure mounted on the hull should have the surfaces located clear of main spray and thus a tee tail is employed since it may also be located in the propeller slipstream. A butterfly tail may be used as an alternative. An alternative embodiment has the engine mounted at the intersection of the vertical and horizontal tails with the pilot nacelle moved forward to preserve the C.G. location.

DETAILED DESCRIPTION AND OPERATION OF THE INVENTION

Figure 1:
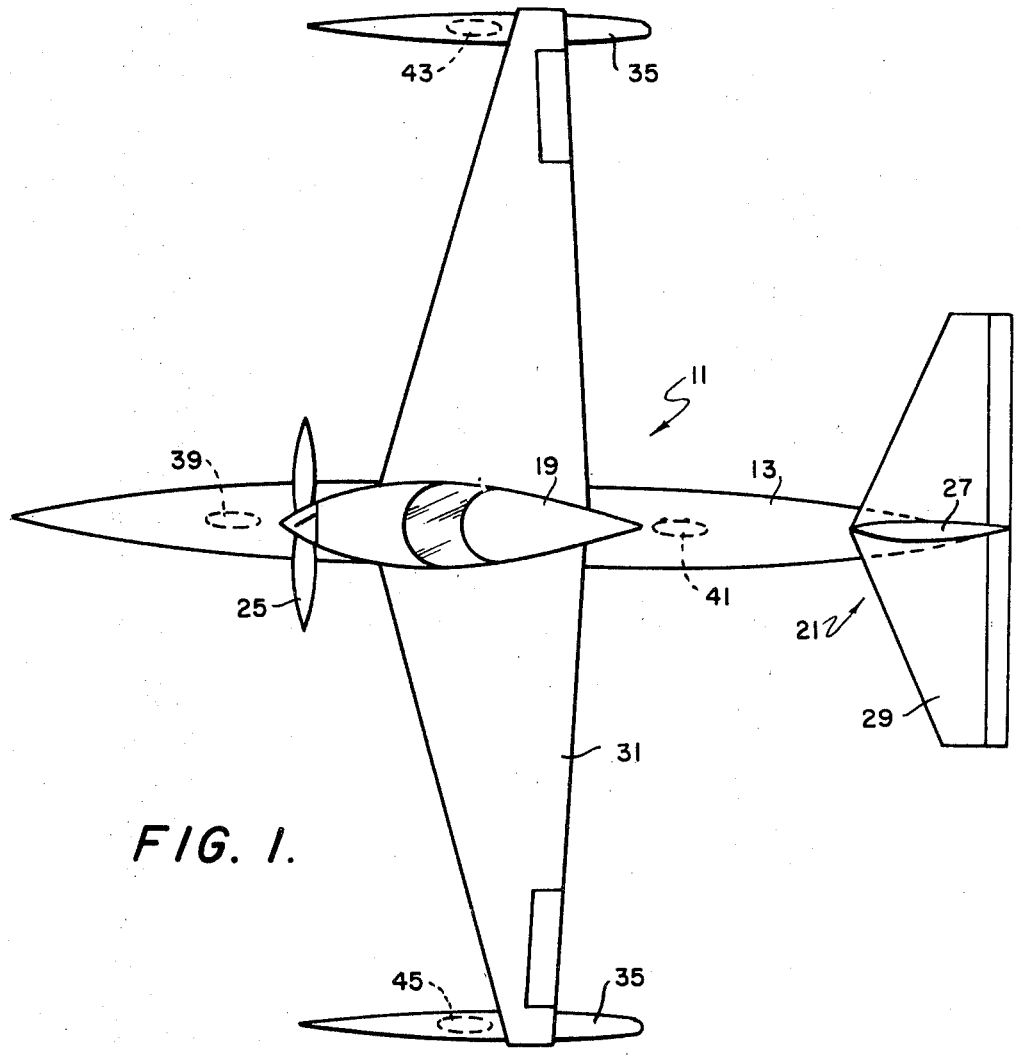
FIGS. 1, 2 and 3 are respective plan, side and front views of one embodiment of an aircraft constructed in accordance with the present invention.
Figure 2:
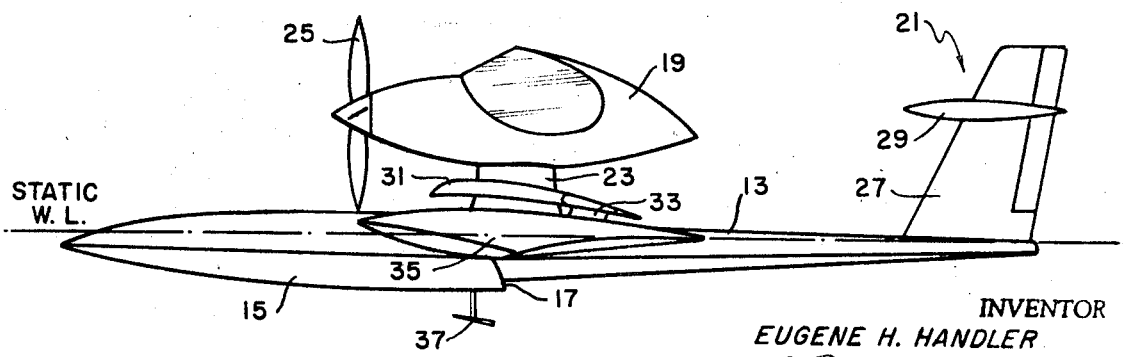
Figure 3:
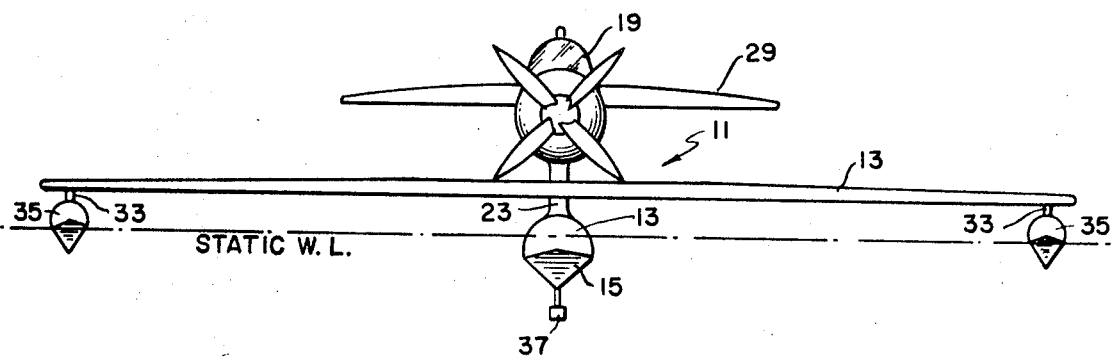

Referring to the drawings in which like reference numerals indicate like parts, and to FIGS. 1—3 in particular, the seaplane or craft of the present invention is designated generally by numeral 11. Seaplane 11 has a central longitudinal hull 13 of slim, faired form with a length-to-beam ratio of the order of about 15 or more and a stepped hydroplane underbody composed of a Vee bottom section 15 and a step 17. The reserve buoyancy of the hull 13 when loaded is about 25 percent as generally indicated by the location of the static waterline W.L.

The hull 13 is the principal longitudinal structural member of the craft and in addition houses control lines for the tail section. The hull carries thereabove body means including a cockpit/engine unit 19 and tail unit 21. The cockpit/engine unit 19 may carry any suitable power plant and as shown is supported above the C.G. and near the midsection of the hull 13 by an upstanding faired strut 23 of sufficient height so as to provide clearance above the hull for jet intake or, as illustrated, for blades of a tractor propeller 25 mounted forwardly on the unit 19. The tail unit 21 is mounted at the aft end of hull 13 and has an essentially upstanding tail rudder section 27 near the top of which is located on elevator unit 29 well above the static waterline W.L.

The seaplane has a low monowing 31 and as best seen in FIGS. 2 and 3 is centrally supported from about the midpoint of faired strut 23. The wing 31 as shown has a swept back leading edge and terminates at each of its extremities at a downstanding strut 33, which constitutes along with tip floats an aerodynamic end plate for the wing. The strut 33 at each wing tip supports a hydroplaning tip float 35 of slim, faired shape. The underbody of each tip float has a Vee bottom and may be provided with a step, if desired, said floats having suitable reserve buoyancy and sufficient immersion to laterally stabilize the craft.

The wing 31 is mounted sufficiently close to the static waterline W.L. as to provide substantial ground effect for the aircraft thereby increasing its low speed lift. The wing 31 may be provided with watertight means, such as enclosed spaces to render additional buoyancy to the craft. While the wing 31 is shown mounted to extend from the strut 23, it is to be understood that the wing may alternatively be mounted to extend from the hull 13, or from atop the hull 13, with only a very small clearance above the static waterline. As illustrated, the clearance of said wing above the static waterline may be preferably less than a quarter of the wing chord.

In order to further enhance the hydrodynamic characteristics of the craft, a supercavitating hydrofoil or hydroski 37 is mounted on an elongated strut depending beneath the hull 13 slightly forward of the center of gravity so as to provide a nose up attitude of the craft during landing and takeoff. The hydroski or hydrofoil 37 provides the following characteristics for the craft while the foil or ski is still completely submerged at low speeds:

1. It damps heave and pitch motions of the craft.
2. It unloads the hull, reducing wave-induced heave and pitch forces.
3. The hull-generated spray is decreased because of the reduced hydrodynamic loads on the hull. Resistance due to spray is lessened.
4. Hull resistance is substantially reduced, since resistance is roughly proportional to hull loading.
5. Time from start of run to hull-planing phase is shortened.

Once the total weight of the craft is carried by the ski or foil plus the wing, the hull is completely clear of the water surface, resulting in the following characteristics:

1. Pitch and heave motions become negligible as foil or ski cuts through waves.
2. Hull generated spray and related resistance decreases to zero.
3. Only light spray and low resistance is generated by the ski or foil.
4. The seaplane responds rapidly to aerodynamic control.
5. The seaplane rapidly accelerates to takeoff
6. Rough water capabilities are enormously improved.

In accordance with the teaching of this invention, it is seen that since the foil or ski unloads the hull, reduces wave impacts, loads due to spray, etc., the aircraft structure can be appropriately lightened. Spray strips can be reduced, the step depth can be decreased, and the hull can be more readily designed to aerodynamic rather than hydrodynamic considerations. The height of components, dictated by spray considerations, can be reduced.

The strut-supported hydroski or hydrofoil 37 may be mounted permanently or retractably in any suitable well known manner so that its rather small amount of drag can be partially or totally eliminated when the craft is completely airborne.

As illustrated in FIG. 1, the seaplane 11 may be provided with retractable landing gear such as bicycle gear composed of retractable wheels 39, 41 tandemly disposed along the centerline of the hull 13 and retractable wheels 43, 45 in the tip floats 35. Other landing gear configurations may, of course, be employed, such as tricycle gear with a bow wheel in the nose of the hull with the main wheels retractable in the wings, or a tail wheel system with main gear retracting into the wings or hull.

Figure 4:
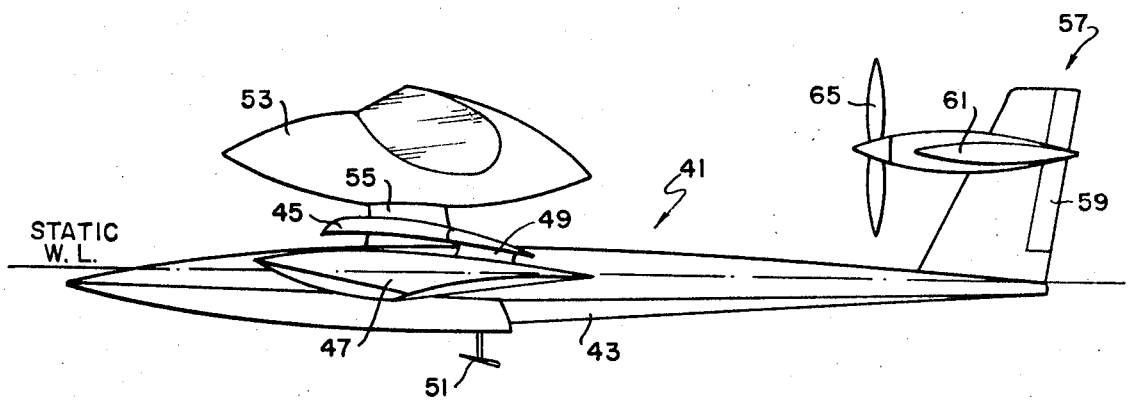
FIG. 4 is a side view of another embodiment of an aircraft constructed according to the present invention.

Reference is now made to FIG. 4 illustrating a seaplane or craft 41 arranged in accordance with another embodiment of the invention. The craft 41 has a central longitudinal planing hull 43 of slim proportions as described in connection with FIGS. 1—3, a low monowing 45, tip floats 47 supported by depending struts 49 at the wing extremities, and a hydroski or supercavitating hydrofoil 51 located on a depending strut just forward of and beneath the C.G. of the craft. The craft has a cockpit unit 53 mounted in an upstanding strut 55 located well forward of the C.G. and unlike the embodiment of FIGS. 1—3, does not include the power plant.

A tail unit 57 is mounted on the aft end of the hull 13 and has a rudder section 59 and an elevator section 61 locate well above the static waterline W.L. Extending forwardly from elevator section 61 is a nacelle 63 carrying a power plant which may be of any suitable design such as jet, rocket, turbo fan, turbo prop, etc., and here illustrated as a tractor propeller 65.

The craft shown in the FIG. 4 embodiment performs in essentially the same manner as that of FIGS. 1—3, and has the advantage of locating the propeller more remotely from the cockpit and from the spray area.

DESCRIPTION OF OPERATION

As previously indicated, the seaplane hull while at rest has about 25 percent reserve buoyancy. The wing 31, if the seaplane is light and small, may be only a few inches or about a foot above the static waterline, and the ski or foil below static waterline about 1 to 3 feet. During takeoff, with the hydroski or supercavitating hydrofoil extended, the ski or foil and hydroplane hull and tip float surfaces lifts the aircraft and provides at low speeds the early attainment of low hydrodynamic drag. The wing 31 provides ground effect and airfoil lift so that, as the hydroplaning surfaces begin to clear the water surface, the hydroski or hydrofoil itself provides all hydrodynamic lift. Thus, wetted hydroplaning surfaces with attendant suction characteristics are avoided as the craft approaches aerodynamic takeoff speed, thereby enabling less drag and quicker attainment of takeoff speed. As the craft, including the ski or foil, completely lifts off and the craft becomes airborne, the ski or foil may be completely retracted in any suitable well known manner, or less than completely retracted, as by being pulled up into hull 13 or 41 until the leading edge is flush with the under surface of said hull. In this position the drag penalty of the ski is only slight. During landing, the ski or foil is extended and is first to contact the water surface, thereby providing low hydrodynamic drag and thus a gentle transition of the craft from airborne to waterborne speed.

In carrying out the present invention it is appreciated that where the wings are negatively dihedral the struts 33 may be eliminated, said wing tips terminable directly at tip floats. Further, because the wing of the present invention is sufficiently close to the water to enable substantial ground effect lift, cumbersome flaps with attendant corrosive equipment such as hinges, rods, etc., may advantageously be eliminated. Further, if desired, spoilers may be employed for control purposes instead of ailerons as generally indicated. Of course, the number and disposition of hydrofoils or hydroskis may be varied from the arrangement illustratively shown. For example, hydrodynamic lifting means may comprise a hydrofoil or ski element located at the bottom of a strut depending from each wing. Also, plural hydrofoil elements may be employed on each depending strut, and as a substitute for the single foil or ski 37 exemplarily shown in the drawings.

It is further understood that while employment of a hydroski or hydrofoil element is advantageous to the working of the invention, the seaplane arrangement will nevertheless operate with some loss of efficiency without said element. In such a case the takeoff angle will be reduced depending upon orientation of the wings, thrust, and presence and extent of a hydroplane step.

It is to be understood that while the sizes of the seaplanes depicted illustratively in the drawings are small, the principles of the present invention apply also to larger craft, the size of the craft not being critical to the invention.

Obviously many modifications and variations of the present invention are possible in the light of the above teachings. It is therefore to be understood that the invention may be practiced otherwise than as specifically described.

What I claim is:

1. A low drag, high density seaplane having performance characteristics like that of a high speed land plane of approximately the same size, comprising:
    a central longitudinal aerodynamically designed hull of approximately 25 percent reserve buoyancy and having a high length to beam ratio of approximately 15:1;
    a first faired strut means connected at one end thereof to said hull and extending upwardly from said hull;
    a flapless monowing centrally supported at the other end of said first faired strut means, said monowing being located a maximum of one-fourth of the wing chord above the static waterline of said hull thereby creating a ground effect with respect to the water, said monowing having a spoiler mounted on the upper surface thereof;
    tip float means connected to the extreme ends of said monowing which provide lateral, hydrodynamic stability, the proximity of said tip float means to said monowing prevents excessive loss through wing tip vortices;
    a second faired strut means connected at one end thereof and extending upwardly from said monowing;
    an aerodynamically configured body means including a personnel carrying section supported at the other end of said second faired strut means;
    tail means removed from said body means connected to said hull at the rear end thereof; and
    a hydrodynamic lifting means connected to said hull for producing hydrodynamic lift.

2. A seaplane as in claim 1, wherein a high thrust power plant means is carried by said body means.

3. A seaplane as described in claim 1, wherein said hydrodynamic lifting means comprises at least one retractable supercavitating hydrofoil.

4. A seaplane as described in claim 1, wherein a high thrust power plant means is carried by said tail means.